Oct. 17, 1967  N. R. BROWN  3,347,127
METAL FASTENER
Filed April 14, 1965

INVENTOR.
Norman R. Brown
BY
Paul Fitzpatrick
ATTORNEY

United States Patent Office 3,347,127
Patented Oct. 17, 1967

3,347,127
METAL FASTENER
Norman R. Brown, Pontiac, Mich., assignor to General Motors Corporation, Detroit, Mich., a corporation of Delaware
Filed Apr. 14, 1965, Ser. No. 448,112
4 Claims. (Cl. 85—37)

ABSTRACT OF THE DISCLOSURE

A rivet-like metal fastener comprising a head which is flattened upon installation and legs extending from the head so that they move apart like scissor blades as the head is flattened, thereby engaging the opposite surface of the parts fastened from the fastener head.

---

This invention relates to sheet metal fasteners and more particularly to a one-piece sheet metal fastener which is inserted through apertures in the members being fastened and which secures itself therein upon the application of force from a suitable tool.

Sheet metal fasteners often are of the conventional rivet type or they are comprised of at least two pieces and are generally quite cumbersome. These fasteners usually require access to both sides of the sheet metal panels in order to assemble the fastener to the metal panels. This, of course, presents many problems where space is critical or where access to the panels can be had on one side only. Hence, the subject invention provides a one-piece sheet metal fastener which is adapted to be secured to the sheet metal panels such that access to the panels is necessary on only one side.

Other objects, features, and advantages of the invention will become obvious upon reference to the following detailed description and the drawings showing the preferred embodiment thereof, wherein.

Figure 3:
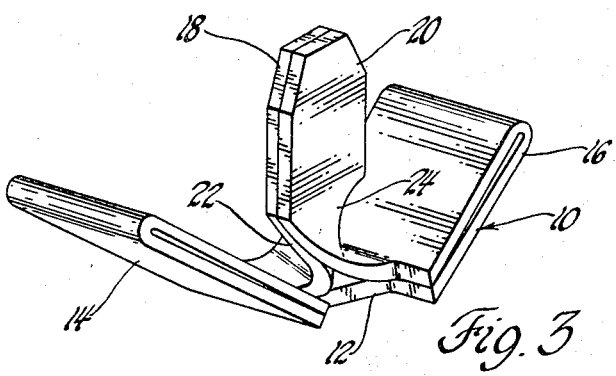
FIGURE 3 is a perspective view of the fastener.

In general, the invention is embodied in a rivet-type construction 10 as seen in FIGURE 3. The device is constructed of one continuous piece of metal. It is seen to include a flat central head portion 12, a pair of sloping shoulder portions 14 and 16, and a pair of legs 18 and 20. It is to be noted that the legs 18 and 20 are twisted about their own axes for a purpose to be discussed later. The legs 18 and 20 have portions cut away so that curved notches 22 and 24 are formed on each side of the legs to serve as engaging members when the device is assembled to sheet metal panels.

Figure 1:
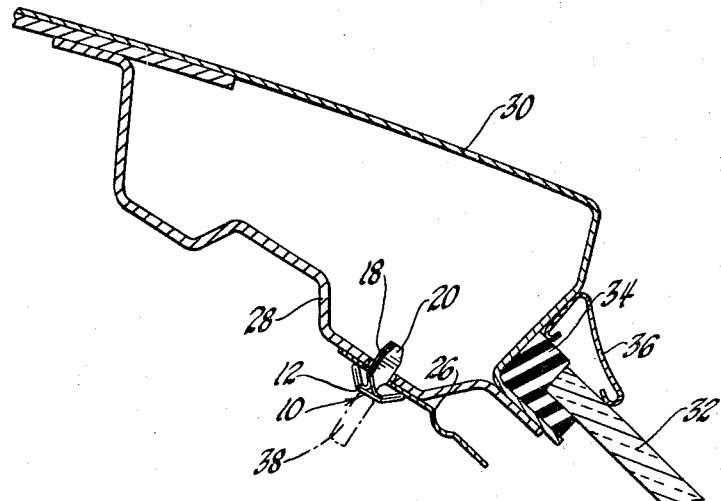
FIGURE 1 is a sectional view showing the invention as applied to securing a trim retainer to the interior framework of the roof of an automobile prior to its being fastened thereto.
Figure 2:
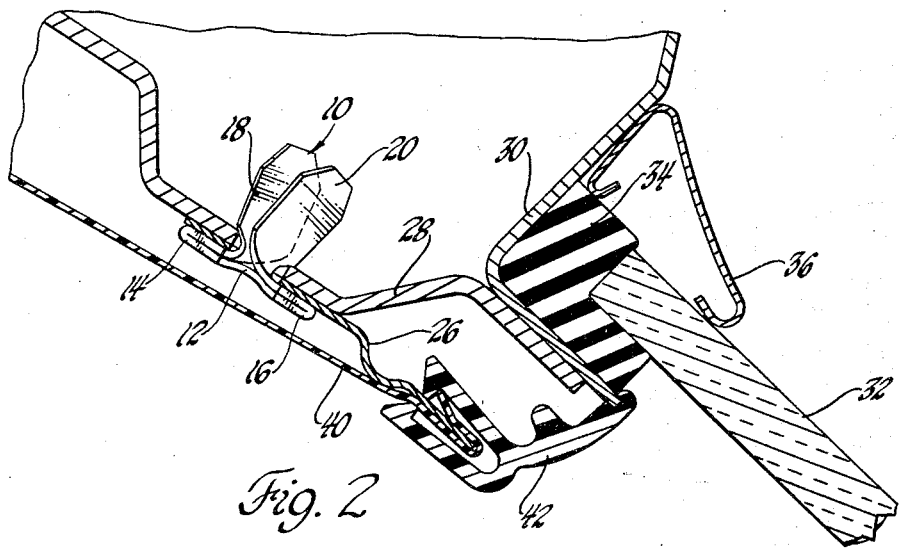
FIGURE 2 is an enlarged view of FIGURE 1 showing the fastener in its installed position securing the members together.

In FIGURE 1, the invention 10 is shown holding a trim retainer 26 to the header portion 28 of the interior roof frame of an automobile. This view is taken at the rear end of the automobile roof at the point where it encounters the rear window 32. It is seen that the rear window 32 is set in a resilient holding and sealing substance 34 and that this substance and part of the rear window are covered by a trim molding 36. The header or interior roof panel 28 will be welded or otherwise fastened to the roof frame 30 as to form an interior frame for the attachment of decorative material such as the headlining material. As seen in FIGURE 1, the sheet metal fastener 10 is positioned to secure the trim retainer 26 to the interior roof frame 28 by passing the twisted leg portions 18 and 20 through the apertures in the piece to be held. A suitable tool 38 is then positioned to apply force to the head portion 12 of the fastener 10 so as to change the fastener from the position shown in FIGURE 1 to that shown in FIGURE 2. As seen in FIGURE 2, upon the application of force to the head portion 12, the sloping shoulders 14 and 16 are flattened against the trim retainer 26 and the leg portions 18 and 20 are forced through the aperture in the metal members 26 and 28. The device is constructed so that upon flattening of the sloping shoulders 14 and 16 the twisted leg portions 18 and 20 undergo a spreading action in a manner similar to a scissoring motion so as to retain the fastener 10 to the members 26 and 28, thereby securing them together. The curved notch portions 22 and 24 on opposite sides of the twisted leg portions 18 and 20 abut the edge of the aperture in the member 28 so as to retain the fastener 10 to the members 26 and 28. In the embodiment shown in FIGURE 2 the headlining material 40 is then placed over the end of the trim retainer 26 and an interior trim molding 42 is snapped over the headlining material 40 on the trim retainer 26 to secure it thereto. Hence, from the interior of the automobile a passenger sees the decorative headlining material 40, the interior trim molding 42 and the rear window 32.

Hence, the invention provides a one-piece sheet metal fastener which can be installed so as to secure the panels with access needed on only one side of the panel. Hence, in production, the subject metal fastener will substantially reduce the time needed to secure two panels together as compared with multi-piece fasteners or conventional rivets which require access to both sides of the panels for assembly. It should also be clear that the subject fastener will have use in any situation where two panels are to be secured together and that the size of the fastener can be varied greatly to adapt it for use with many different size panels.

Looking at the specific details of the invention as shown in FIGURE 3, it is seen that the legs are twisted approximately 90 degrees about their own longitudinal axes. The preferred twist angle is 84 degrees and the invention has been found to be successful with an angle in the range between 60 degrees and 90 degrees. The effective holding ability increases as the angle approaches 84 degrees but the possibility of fracture also increases as the angle approaches 90 degrees. The twisting results in a substantial increase in rigidity in the legs upon sliding separation as compared with straight, non-twisted legs after they have pivotally separated. It also should be noted that the head portion 12 and the twisted portion of the legs or furcations 18 and 20 are reduced in area so that such twisting is made more feasible. This reduction in area of the shank portion of the legs also forms the curved notches 22 and 24 which abut the member being held after the legs have slid apart.

Although but one embodiment of the invention has been described in detail, it should be clear to those skilled in the art to which the invention pertains that it would have many different uses and that many changes and modifications may be made thereto without departing from the scope of the invention.

I claim:
1. A one-piece fastener for joining at least one sheet member to an associated member, said fastener comprising:
   a substantially planar central head portion;
   a pair of sloping shoulder portions each having a first layer connected to and at an angle with said head portion and a second layer rebent from one of the ends of and parallel with the first layer, said shoulders and head portion forming a substantially concave body in relation to the members being joined;

and a pair of adjacent legs substantially flat on two sides and bent from the other ends of the second layers of said shoulders in a direction substantially perpendicular to said head portion, said legs abutting face-to-face and being twisted through an angle in the range of 60 to 90 degrees about their longitudinal axes, so that they move apart relative to each other with the abutting faces of said legs moving past each other in a scissoring action upon the application of force to said head portion and the resultant flattening of said shoulder portions into the same plane as said head portion against one of the members being joined.

2. A one-piece fastener as set forth in claim 1 wherein the second portions are each twisted through an angle in the range of 80 to 88 degrees.

3. A one-piece rivet-like fastener adapted to be inserted through holes in mutually abutting members to join the members together, the fastener being constituted by a single formed strip of ductile material, the fastener comprising:

a head including two shoulder portions defining a dihedral angle, each shoulder portion having an upper layer and a lower layer, the upper layers connecting the shoulder portions, the lower layer being rebent from one of the ends of the upper layer and lying against the lower surface of the upper layer of each shoulder portion, the lower layers meeting adjacent the said angle and being bent so as to lie in face-to-face abutment defining a pair of legs extending substantially along the bisector of said angle, the legs being twisted approximately 60 to 90 degrees about the axes of the legs at their junctions with the lower layers so that they move apart edgewise relative to each other, with the faces of the legs moving past each other upon the application of force pressing said head portion against the members to be joined, thereby deforming the head so as to bring the shoulders toward a common plane.

4. A fastener as recited in claim 3, the legs each being provided with a notch in the edge of the strip adjacent one of the shoulders, the side of the notch opposite each of the shoulders providing an abutment adapted to engage the opposite surface of the members being joined from that engaged by the head.

References Cited

UNITED STATES PATENTS

| | | | |
|---|---|---|---|
| 1,873,871 | 8/1932 | Carr | 24—208 |
| 2,913,952 | 11/1959 | Becker | 85—38 |

WILLIAM FELDMAN, *Primary Examiner.*

E. SIMONSEN, *Assistant Examiner.*